US012785803B2

(12) United States Patent
Das et al.

(10) Patent No.: US 12,785,803 B2
(45) Date of Patent: Nov. 3, 2026

(54) SYSTEM AND METHOD FOR JOINT COMMUNICATION AND ILLUMINATION THROUGH UNMANNED AERIAL VEHICLES

(71) Applicant: INDIAN INSTITUTE OF TECHNOLOGY KHARAGPUR, Kharagpur (IN)

(72) Inventors: Ankana Das, Kharagpur (IN); Kirtan Gopal Panda, Kharagpur (IN); Murala Laxmi Naresh Kumar, Kharagpur (IN); Debarati Sen, Kharagpur (IN); Sandip Chakraborty, Kharagpur (IN)

(73) Assignee: INDIAN INSTITUTE OF TECHNOLOGY KHARAGPUR, Kharagpur (IN)

( * ) Notice: Subject to any disclaimer, the term of this patent is extended or adjusted under 35 U.S.C. 154(b) by 177 days.

(21) Appl. No.: 18/651,313

(22) Filed: Apr. 30, 2024

(65) Prior Publication Data

US 2025/0392388 A1 Dec. 25, 2025

(30) Foreign Application Priority Data

Jun. 28, 2023 (IN) ............................ 202331043273

(51) Int. Cl.
*H04B 10/116* (2013.01)
*H04B 7/185* (2006.01)
*H04B 10/112* (2013.01)

(52) U.S. Cl.
CPC ....... *H04B 10/116* (2013.01); *H04B 7/18506* (2013.01); *H04B 10/1129* (2013.01)

(58) Field of Classification Search
None
See application file for complete search history.

(56) References Cited

U.S. PATENT DOCUMENTS 8,434,920 B2 * 5/2013 Jones ..................... B64U 80/70 362/85
9,281,896 B2 * 3/2016 Teller ................... H04B 10/118
(Continued)

OTHER PUBLICATIONS

Yang, Y. et al., "Power Efficient Visible Light Communication With Unmanned Aerial Vehicles," *IEEE Communications Letters*, vol. 23, No. 7, Jul. 2019, pp. 1272-1275.
(Continued)

*Primary Examiner* — Jai M Lee
(74) *Attorney, Agent, or Firm* — MASUVALLEY & PARTNERS; Peter Martinez

(57) ABSTRACT

Visible light communication (VLC) enabled unmanned aerial vehicles (UAVs) have evolved as a promising technology for the fifth generation and beyond communications. The proposed invention describes a system and methodology for deploying VLC-enabled UAVs, which serve as flying base stations (V-FBSs) over the target area: disaster regions, concert and fest areas, and search and rescue operations zones. The V-FBSs provide both communication and illumination. The proposed system follows CRAN architecture, which helps reduce the CAPEX and OPEX significantly. Further, present disclosure delivers a complete method to deploy the V-FBS network along with the detailed synchronization process required for autonomous deployment. It offers a complete 3-D deployment of the V-FBSs, which ensures minimum interference while satisfying the promised QoS and providing an energy-efficient position. The proposed network is scalable and can significantly reduce the outage. Since VLC is used for the present invention, the network does not interfere with the neighboring RF networks.

11 Claims, 8 Drawing Sheets

(56) References Cited

U.S. PATENT DOCUMENTS

Figure 1:
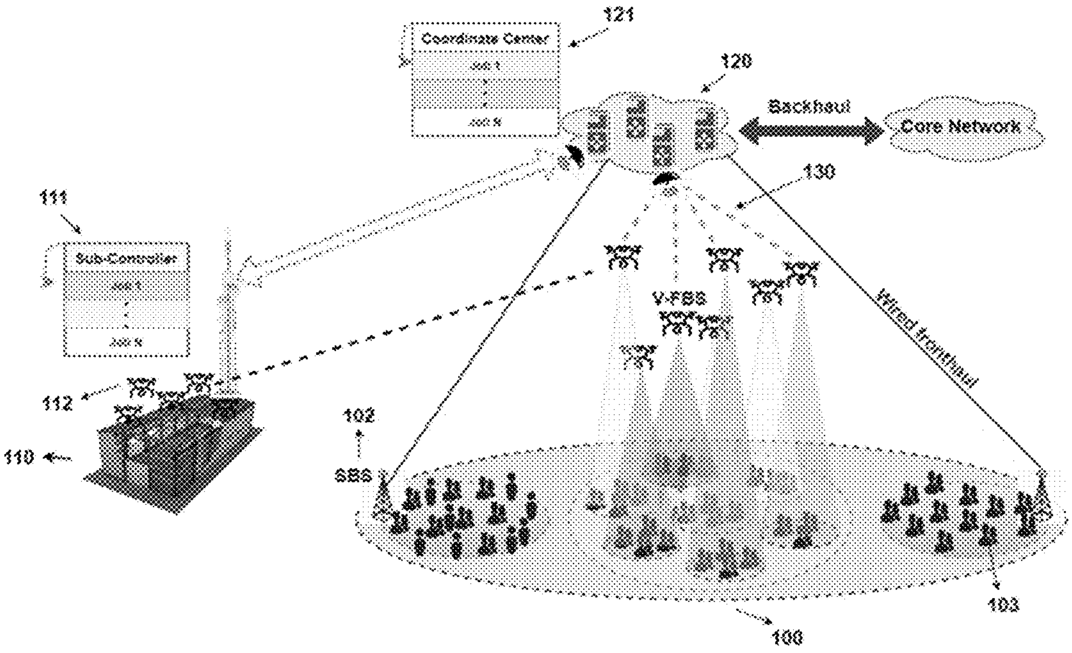

| | | | | |
|---|---|---|---|---|
| 9,409,644 | B2 | 8/2016 | Stanek et al. | |
| 9,421,869 | B1 | 8/2016 | Ananthanarayanan et al. | |
| 9,940,842 | B2 * | 4/2018 | Shaw | G08G 5/26 |
| 10,716,110 | B2 * | 7/2020 | Luo | H04W 72/0453 |
| 11,032,148 | B2 * | 6/2021 | Sweet, III | C23C 16/24 |
| 11,968,025 | B2 * | 4/2024 | Hirai | H04B 17/345 |
| 12,088,397 | B2 * | 9/2024 | Zakaria | H04W 24/02 |
| 2021/0036777 | A1 * | 2/2021 | Ben Moshe | G01S 3/786 |
| 2021/0136595 | A1 | 5/2021 | Hashemi et al. | |
| 2024/0014831 | A1 * | 1/2024 | Parker | H04B 1/0003 |
| 2024/0154698 | A1 * | 5/2024 | Rojas-Cessa | H04B 10/112 |
| 2025/0119799 | A1 * | 4/2025 | Zhang | H04W 36/06 |
| 2025/0374258 | A1 * | 12/2025 | Luo | H04W 72/0453 |

OTHER PUBLICATIONS

Zhong, X. et al., “QoS-Compliant 3D Deployment Optimization Strategy for UAV Base Stations,” *IEEE System Journal*, URL: https_//arxiv.org/pdf/2008.0312Sv1_pdf, Aug. 7, 2020, 9 pages.

Eltokhey, M. et al., “UAV Location Optimization in MISO ZF Pre-Coded VLC Networks,” *IEEE Wireless Communications Letters*, vol. 11, No. 1, Jan. 2022, pp. 28-32.

* cited by examiner (a)

(b)

(c)

(d)

(a)

(b)

SYSTEM AND METHOD FOR JOINT COMMUNICATION AND ILLUMINATION THROUGH UNMANNED AERIAL VEHICLES

RELATED APPLICATIONS

This application claims priority to India patent application No. 202331043273, Filing Date Jun. 28, 2023, entitled System And Method For Joint Communication And Illumination Through Unmanned Aerial Vehicles, which is incorporated herein by reference in its entirety.

FIELD OF THE INVENTION

Unmanned aerial vehicles (UAVs) enabled with visible light communication (VLC) can serve as VLC enabled flying base stations (V-FBSs) in the 5G and beyond communications. The present disclosure addresses the system and method for providing joint communication and illumination using V-FBSs. The proposed system incorporates V-FBSs in the cloud radio access network (CRAN). The 3-D deployment method exhibit how to place a minimum number of V-FBSs energy efficiently over a region to offer guaranteed quality of service (QoS) without inter-V-FBS interference and V-FBS capacity limit violations.

BACKGROUND OF THE INVENTION

The exponential increase in user demands has led the telecommunication community to move on to the fifth-generation and beyond networks. The fifth-generation and beyond networks aim to surpass their predecessor in terms of higher data rates, lower latency, and improved quality of service (QoS). In order to meet these promises, the telecommunication communities are looking into other frequency spectrums alongside the prevalent radio frequencies. Visible light communication (VLC) is one paradigm that has caught the attention of both industry and academia. The visible light spectrum provides a massive unlicensed bandwidth of around 360 THz, which can solve the spectrum crunch problem and provide communication and illumination.

Further, setting up static base stations (SBSs) to provide connectivity can significantly increase capital expenditure (CAPEX). At times, it might not be possible due to the geography of the place or if the connectivity required is for a short duration. Unmanned aerial vehicles (UAVs) enabled mobile access network have garnered considerable attention among the telecommunication research community. They can be deployed quickly, reduce the capital expenditure (CAPEX) significantly and do not require direct human involvement. During large social gatherings (e.g. fest, carnivals, rallies and concerts) the existing static base stations (SBSs) can get overloaded and users can be in outage. In such cases UAVs can be deployed to form an auxiliary network and provide communication to the users who are in outage. Further, UAVs can be deployed in disaster affected areas as well, where the static base stations (SBSs) are destroyed due to the natural calamity.

The CAPEX can be further reduced if a cloud radio access network (CRAN) based network architecture is opted. The CRAN architecture consists of a baseband processing unit (BBU) pool set in the cloud, which ensures resource pooling and remote radio heads (RRHs), which can be either static (static base stations) or flying (flying base stations).

Reference is invited for the related prior arts:

Y. Yang, M, Chen, C. Guo, C. Feng, and W. Saad, "Power efficient visible light communication with unmanned aerial vehicles", IEEE Communication letters, vol 23, no. 7, pp. 1272-1275, 2019 reported Increasing power efficiency of battery driven V-FBSs.

Proposed a randomized cell based algorithm to find the 2-D position of the V-FBS However the energy efficient vertical placement which could save more battery power of V-FBSs was not exploited.

M. W. Eltokhey, M. A. Khalighi, and Z. Ghaaaemlooy, "UAV Location Optimization in MISO ZF Pre-coded VLC Networks", IEEE Wireless Communication Letters, pp 1-1, 2021 proposed

- a particle swarm optimization (PSO) based deployment algorithm to address inter-cell interference and increase overall network throughput. However the paper proposes 2-D deployment which does not exploit the energy efficient vertical placement of the V-FBSs.

X. Zhong, Y. Huo, X. Dong and Z. Liang, "QoS compliant 3-D deployment optimization strategy for UAV base stations", IEEE Systems Journal, vol. 15, no. 2, pp. 1795-1803, 2020 proposed a genetic algorithm to find the 2-D locations of V-FBS that cover the maximum number of users while satisfying users' data rate and V-FBS's capacity limit. However, genetic algorithm is an iterative process and may require huge convergence time. In addition the interference constraint is not considered for V-FBS placement and needs the number of V-FBS as input.

Kenneth R Jones, "Aerially Deployed Illumination System" U.S. Pat. No. 8,434,920B2, issued May 7, 2013 disclosed an aerially deployed illumination system wherein the illumination system is mounted on UAV and remotely controlled. However the advancement only teaches illumination and not communication.

M. Hashemi, M. Coldrey, J. Friden and L. Manholm, "Planning Deployment of a Node in a Communications Network With a Drone" US Patent No: 20210 136595 A1, issued May 6, 2021 involved drones in cell planning and new base station deployment and considered both automatically controlled drones by internal soft-wares and manually controlled drones by technician. However, the detailed controlled mechanism is missing. Further during multiple drone scenarios, the technique to maintain inter-drone synchronization is not discussed.

C. W. Sweet, E. H. Teague and M. F. Taveira, in "Managing Network Communication of An Unmanned Autonomous Vehicle" U.S. patent Ser. No. 01/032,148 B2, issued Jun. 8, 2021 taught managing the network communication between cellular-capable UAVs and ground base stations depending on various embodiments like data rate, interference and QoS. The advancement also considered for inbuilt processor inside UAVs to take decisions autonomously to change different UAV parameters like altitude, speed based on different inputs from inbuilt sensors like barometer, camera and GPS. However the advancement is silent regarding deployment and inter-UAV synchronization to maintain the communication.

J. F. Stanek and J. A. Lockwood, "Automotive Drone Deployment System" U.S. Pat. No. 9,409,644 B2, issued Aug. 9, 2016 discussed deployment of individual drone only. Drone is used only for sensing traffic and environment-related information wherein drone position is remotely controlled by automotive vehicle means and no automatic navigation of drone is taught.

P. R. Sai, Ananthanarayanan, A. Dron, A. Nepoles, R. Sammeta and M. Zheng, "Deployment and Adjustment of Air-borne Unmanned Aerial Vehicles" U.S. Pat. No. 9,421,869 B1, issued: Aug. 23, 2016 proposed the deployment planning mainly focusing on single power UAV system. Although, the position of power UAV is varied according to request location for monitoring, location of rechargeable UAV and suitable environmental condition, however no method is discussed about the path planning to reach that location. UAV is used to monitor overhead power lines and recharge other UAVs simultaneously. The monitored UAV also generates power from the electromagnetic field generated by overhead power line and uses that power to recharge other UAVs under flying stage.

Visible light communication (VLC) based unmanned aerial vehicles (UAVs) can simultaneously transmit data and provide illumination, which has been considered as a promising technology for the next generation wireless networks wherein visible light frequencies instead of the traditional radio frequencies are used and the UAVs are visible light communication (VLC) enabled and advantageously the VLC enabled UAVs can serve as VLC enabled flying base stations (V-FBSs). Though the incorporation of the V-FBSs in the 5G and beyond network seems lucrative, however there exists many technical challenges; efficient 3-D deployment is one of them. If the V-FBSs are randomly deployed then the UEs in outage will increase (as discussed later in the disclosure) and thus the network deployment will not yield the expected benefits. Thus a system and method for efficient 3-D deployment of V-FBSs, which would provide joint communication and illumination in a cost-effective manner is an urgent need in the art.

OBJECT OF THE INVENTION

Primary objective of the present invention is to provide a system and methodology for joint communication and illumination through unmanned aerial vehicles employing visible light frequencies instead of the traditional radio frequencies wherein said visible light communication will ensure no interference with the other radio frequencies and no need for a license to access the VLC bands.

Another objective of the present invention is to provide said system wherein visible light communication (VLC) enabled unmanned aerial vehicles (UAVs) will serve as VLC enabled flying base stations (V-FBSs).

Another objective of the present invention is to provide said system wherein VLC-enabled FBSs (V-FBSs) provide communication and illumination to the user equipments (UEs).

Another objective of the present invention is to provide said system that would reduce the CAPEX and can provide connectivity when summoned by the network operator.

SUMMARY OF THE INVENTION

The primary aspect of the present invention is directed to provide a system for telecommunication involving visible light communication comprising:

- joint communication and illumination based unmanned aerial vehicles based communication network including visible light communication enabled flying base stations (V-FBSs) favouring connectivity flexibility and dynamically supplemented communication network.

Another aspect of the present invention is directed to provide said system comprising said VLC enabled FBS providing supplementary communication system alongside prevalent RF communications.

Another aspect of the present invention is directed to provide said system wherein said V-FBS network includes V-FBS workshop (110) for storing and maintaining the V-FBS operatively connected to said BBU Pool (120) via controller means (111) for desired supplemented communication network support system.

Further aspect of the present invention is directed to provide said system comprising: V-FBS workshop (110) for storing and maintaining said V-FBS operatively connected to said BBU pool (120) to initiate V-FBS deployment when under overload and the users (103) are in an outage;

- coordination center (121) in the BBU pool adapted to communicate with sub-controller (111) in the V-FBS workshop (110), for sending a reconnaissance UAV to the deployment area;
- said V-FBS workshop (110) interactive to receive said reconnaissance UAV and reports to the sub-controller (111) regarding the area of the deployment zone (Ar), the number of UEs (N) that need coverage, and the location coordinates of the UEs;
- said sub-controller (111) adapted to send the inputs to the coordination center (121) (Step 4), which in turn further adapted to offload that to the processing unit of the BBU pool (120);
- processing unit for computing the number of V-FBSs required, their deployment coordinates, the data rate, and the power of using VAnSA and V-height methodologies;
- said processing unit operative to relay the information to the sub-controller (111), enabling checks including the battery backup, calibration of the flight controller, and the VLC systems of all the V-FBSs;
- said sub-controller adapted to select the V-FBSs suitable for deployment and means for loading the information on flight altitude, velocity, acceleration, take-off time, 3-D coordinates, data rate, and illumination power onto the selected V-FBSs;
- said sub-controller adapted to send feedback to the coordination center (121), said coordination center generating required fly-out signal as acknowledgment;
- said sub-controller (111) generating take-off signal to the selected V-FBSs and feed the coordination center about the successful take-off of selected V-FBSs and hand control and coordination to the BBU pool (120);
- wherein said communication is established between the V-FBSs and the BBU pool via the wireless fronthaul.

Another aspect of the present invention is directed to provide said system wherein said V-FBS deployment is based on the channel gain hg between the $i^{th}$ UE and the V-FBS which depends on the angle of irradiance Θ, angle of incidence ϕ, the vertical distance of the V-FBS H, and the horizontal distance R and

- wherein preferably said V-FBS deployment is based on maintaining a threshold channel gain $hg_{th}$, and the coverage radius $R_c$ corresponding to this threshold channel gain being maximum coverage radius $R_{max}$. such that the coverage radius of the V-FBS is less than $R_{max}$ including
- a 3-D deployment wherein the 3-D placement is based on horizontal placement and vertical placement with said horizontal placement includes VLC-enabled anticlockwise spiral arrangement (VAnSA) which locates the 2-D position (X, Y) of the V-FBS for guaranteed QoS and illumination to the UEs and also adheres to the V-FBS capacity limit with no overlap between the coverage regions.

Yet another aspect of the present invention is directed to provide said system wherein each said V-FBS is having a fixed UE handling capacity K which is defined by ratio of maximum channel capacity C to the minimum offered data rate by V-FBS to the UE.

Yet another aspect of the present invention is directed to provide said system which is configured to generate utility function and find potential UEs that can be associated with current V-FBS which is based on variable $r_0$ denotes the current V-FBS radius $$Func = \left(\frac{Dis_{min}}{Rad_{min} + r_0} - 1\right)\frac{\|I_{in}\|}{\|I\|}\frac{\|U_{bound}\|}{\|E\|}$$

said utility function ensuring that the coverage region of the V-FBS does not overlap with any of the previously deployed V-FBSs, the location and coverage radius of the V-FBS which ensures maximum utility value is selected and the covered UEs list $U_{cov}$ is updated (512);

based on location and coverage area of V-FBS, the system is adapted to update U and E ensuring the already covered UEs are not considered for the next V-FBS deployment.

Further aspect of the present invention is directed to provide said system comprising based on coverage and horizontal position of the V-FBS means for generating energy efficient altitude to provide complete 3-D deployment preferably energy efficient 3-D positions of the V-FBSs to deploy mobile network for 5G and beyond.

Still further aspect of the present invention is directed to provide said system comprising swarm of deployed V-FBSs integrated in cloud radio access network (CRAN) wherein selectively (i) FBSs comprise as remote radio heads (RRHs) and establish connection with the baseband unit (BBU) through wireless communication links (ii) as independent flying base station for extending coverage range of cellular communications and wherein power of illumination, 3-D position of the V-FBSs are generated based on VAnSA and V-height techniques.

Another preferred aspect of the present invention is directed to provide a method for telecommunication including visible light communication involving the system comprising:

carrying out step of joint communication and illumination based unmanned aerial vehicles communication network including visible light communication (VLC) enabled flying base stations (V-FBSs) favouring connectivity flexibility and dynamically supplemented communication network.

Another aspect of the present invention is directed to provide said method wherein said VLC based flying base stations (V-FBSs) disposition is carried out free of any interference with the radio frequencies and energy efficient 3-D deployment.

Yet another aspect of the present invention is directed to provide said method comprising:

guaranteed QoS while maintaining non V-FBSs interference and satisfying the V-FBS capacity limit of the deployed network and minimized outrage percentage in deployment zone which is integrated in cloud radio access network (CRAN) where the V-FBSs serve as remote radio heads (RRHs) and establish the connection with the baseband unit (BBU) through wireless communication link.

Still further aspect of the present invention is directed to provide said method wherein said V-FBSs are deployed as independent flying-base station and involved for extending coverage range of cellular communications;

BBU pool gets the inputs about area of the deployment zone, number of user equipments (UEs) and UEs location by sending a reconnaissance UAV from the V-FBS workshop;

wherein each V-FBSs capacity is considered the same and is calculated by a coordination center in the BBU pool for the total data rate that can be provided by the V-FBSs and the data rate requirement of the UE;

wherein the threshold channel gain is obtained using the QoS demand, maximum transmission power and noise power; and wherein the power of illumination, 3-D position of the V-FBSs are generated involving the VAnSA and V-height techniques.

DETAILED DESCRIPTION OF THE INVENTION

As stated hereinbefore Visible light communication (VLC) based on unmanned aerial vehicles (UAVs) is a promising technology for the next generation wireless networks where visible light frequencies can be used instead of the traditional radio frequencies and the UAVs can be visible light communication (VLC) enabled. Thus the VLC enabled UAVs can serve as VLC enabled flying base stations (V-FBSs). Though the incorporation of the V-FBSs in the 5G and beyond network seems lucrative, it faces many technical challenges including efficient 3-D deployment. The present disclosure proposes a system and method for efficient 3-D deployment of V-FBSs, providing joint communication and illumination.

In the primary embodiment this disclosure proposes a system and methodology for joint communication and illumination through unmanned aerial vehicles. VLC-enabled FBSs (V-FBSs) provide communication and illumination to the user equipments (UEs). Visible light communication ensures no interference with the other radio frequencies and no need for a license to access the VLC bands. V-FBSs reduce the CAPEX and can provide connectivity when summoned by the network operator.

Setting up static base stations (SBSs) to provide connectivity can significantly increase capital expenditure (CAPEX). At times, it might not be possible due to the geography of the place or if the connectivity required is for a short duration. In these contexts the unmanned aerial vehicles can be used as flying base stations (FBSs). The CAPEX can be further reduced if a cloud radio access network (CRAN) based network architecture is opted. The CRAN architecture consists of (a) baseband processing unit (BBU) pool set in the cloud, which ensures resource pooling and (b) remote radio heads (RRHs), which can be either static (static base stations) or flying (flying base stations). The BBU pool is connected to the RRHs by the fronthaul.

In another embodiment for the present invention while deploying a V-FBS network, the position where the V-FBS should hover above the ground should be fed as an input to the V-FBS. The processing unit of the BBU pool calculates the positions of the V-FBSs depending on the dimensions of the area of deployment, number of user equipments present and the promised QoS. It is to be noted that during deployment planning it is also needed to find out how many V-FBSs should be deployed alongside finding their hovering positions. The processing unit of the BBU pool calculates the number of V-FBSs to be deployed using VAnSA. This makes the proposed system dynamic and efficient as the network can be scaled up as per demands.

In a related embodiment in-order to avoid interference between the coverage regions of the adjacent V-FBSs in the deployment zone, present system proposes a non inter V-FBS overlap strategy. The processing unit of the BBU pool ensures that the locations at which the V-FBSs hover in the deployment zone guarantee non overlap of the coverage regions of the V-FBSs. This is the novelty of the proposed system of the present invention and it is done using the VAnSA deployment methodology.

In another embodiment of the present invention satisfying the quality of service (QoS) requirements is of primary importance while setting up a network and that can be ensured by providing adequate communication. If the QoS is not satisfied then deploying the V-FBS network is futile. So the proposed system ensures that the V-FBS network is deployed in such a manner so as to guarantee a certain QoS. Further, to enhance the network lifetime it has to be ensured that the deployment is energy efficient. The proposed system takes this important factor into account while computing the hovering locations of the V-FBSs. Hence, it is evident that the present system provides guaranteed QoS and energy efficiency using VAnSA and V-Height deployment methodologies.

In another embodiment of the present invention use of drones as flying base stations provides a flexible mobile network which can be deployed whenever the need arises. The network can be deployed quickly in an economic manner. When the V-FBSs are incorporated in the CRAN network, they form a supplementary network to the static base stations to minimize outage. The V-FBS maybe quad copters (but not limited to) with communication modules alongside the paraphernalia used for flight.

In another embodiment of the present invention to provide emergency communication at a particular deployment zone, wherein setting up static base stations is not feasible both in terms of time and money—flying base stations can come to rescue. Since the V-FBSs are mobile they can migrate to the deployment zone as per the directions of the processing unit of the BBU pool. Examples of deployment zones are (but not limited to) Hotspots (over crowded areas likes fests, rallies, carnivals and events like Olympics), disaster affected areas where the static base stations are destroyed due to natural calamities (e.g. earthquakes, flood, landslides, etc.). In such scenarios in order to provide connectivity and establish emergency communication to broadcast news about relocation camps and aids, search and rescue operations, survey and collection of vital data is aided by deployment of V-FBS network. Providing illumination further helps in night search and rescue and signaling operations. The V-FBS network can also be used in industrial Internet of Things (IIoT).

The advantages of the present invention over the comparable advancements:

a) Economical and easily deployable.
b) Provides joint communication and illumination.
c) Energy efficient deployment.
d) Provides a complete 3-D deployment solution.

It is to be understood that both the foregoing general description and the following detailed description are exemplary, and are intended to provide further explanation of the invention directed to the advance of system and method for joint communication and illumination through unmanned aerial vehicles exclusively for the present invention. The advancement according to the present invention is discussed in further detail in relation to the following non-limiting exemplary illustrations and accompanying figures wherein:

FIG. 1 V-FBSs network deployment over the deployment area.

Figure 2:
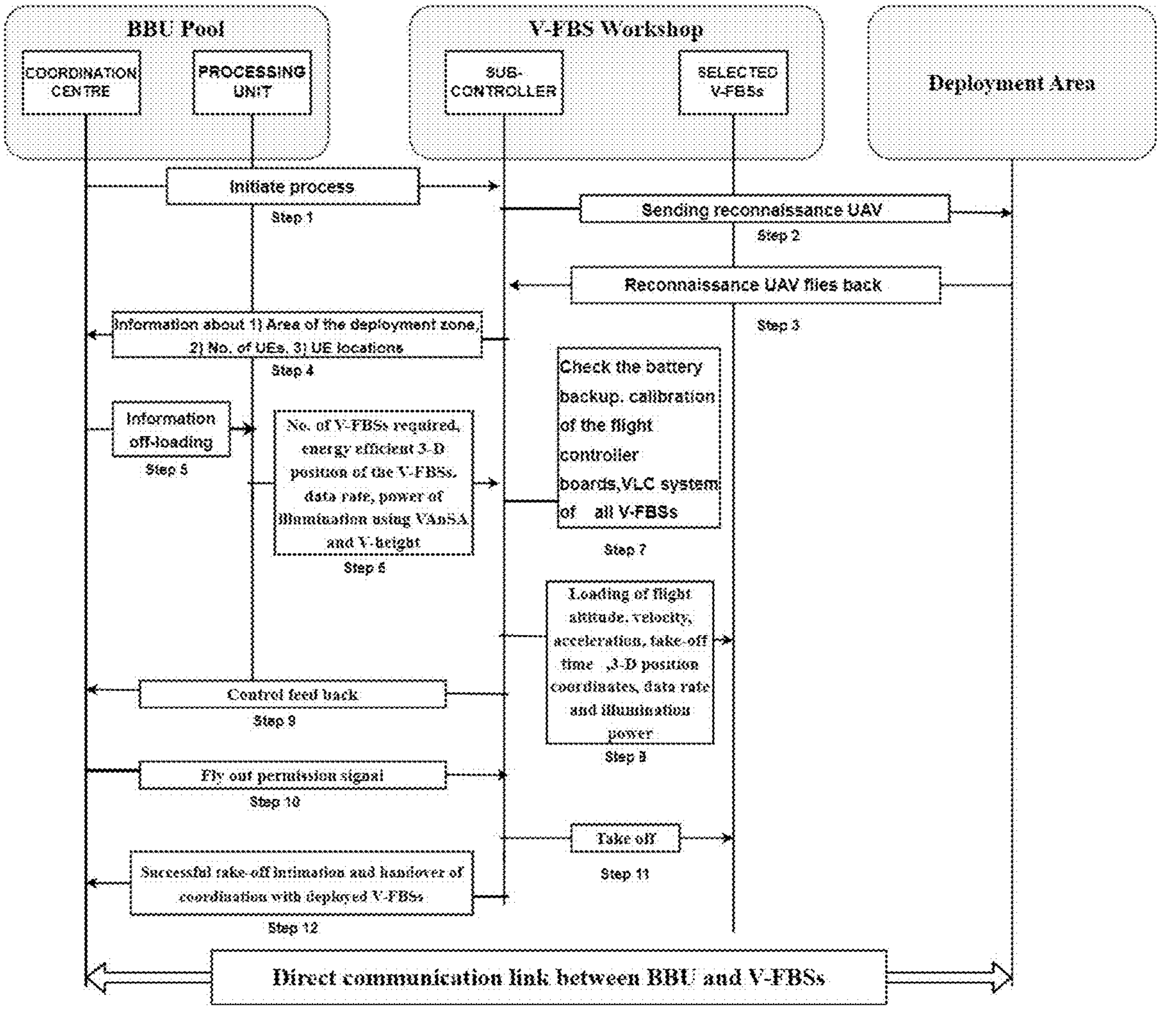

FIG. 2: Time-synchronization diagram of the V-FBS system.

Figure 3:
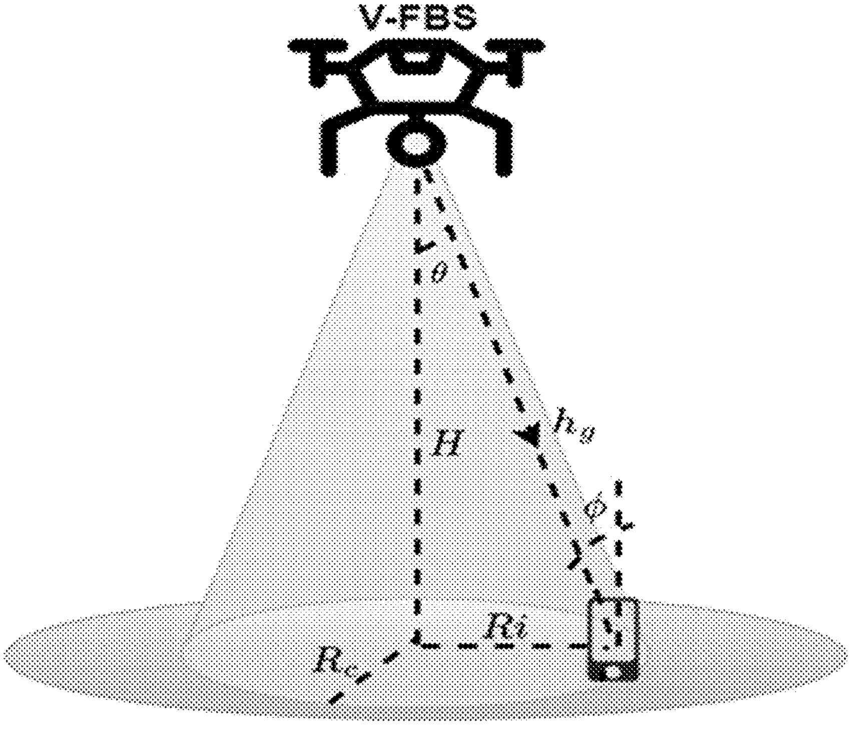

FIG. 3: System model for V-FBS

Figure 4:
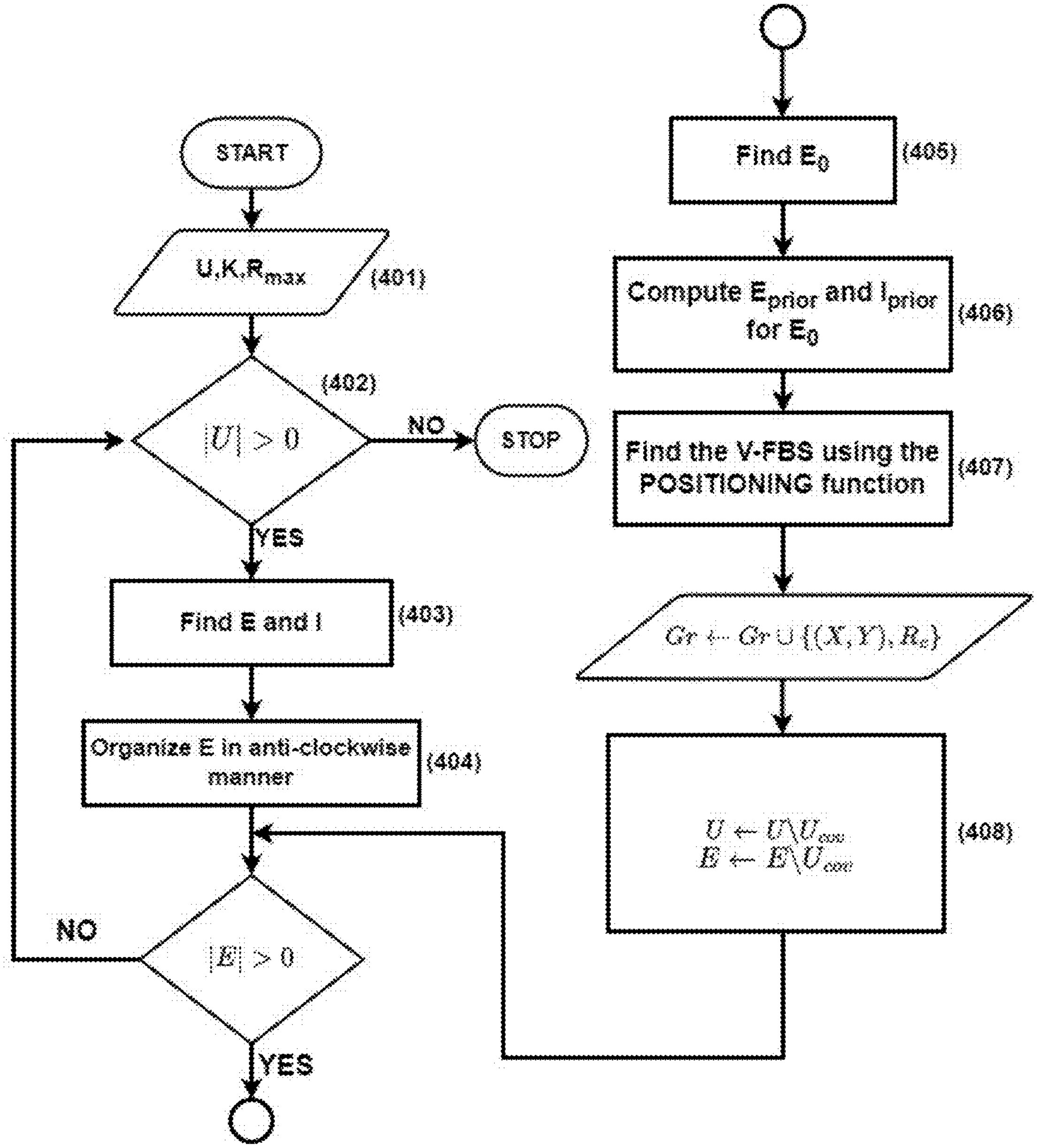

FIG. 4: Flowchart for VAnSA deployment strategy.

Figure 5:
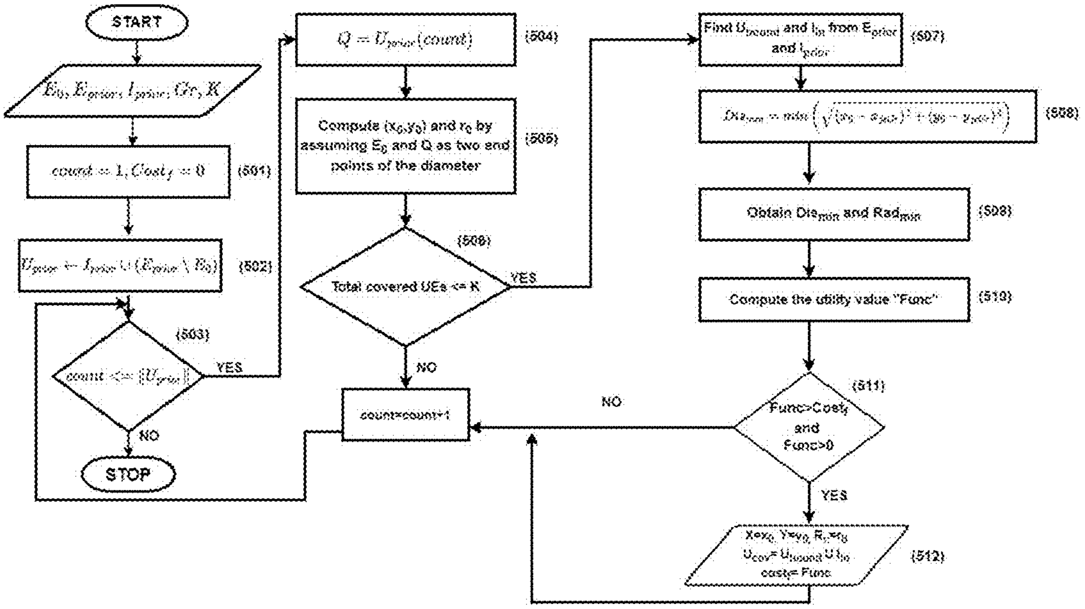

FIG. 5: Flowchart of POSITIONING function (407).

Figure 6:
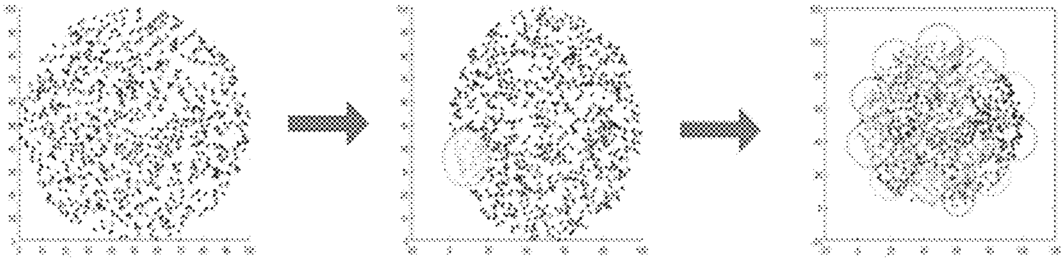

FIG. 6: Various steps of VAnSA deployment.

Figure 7:
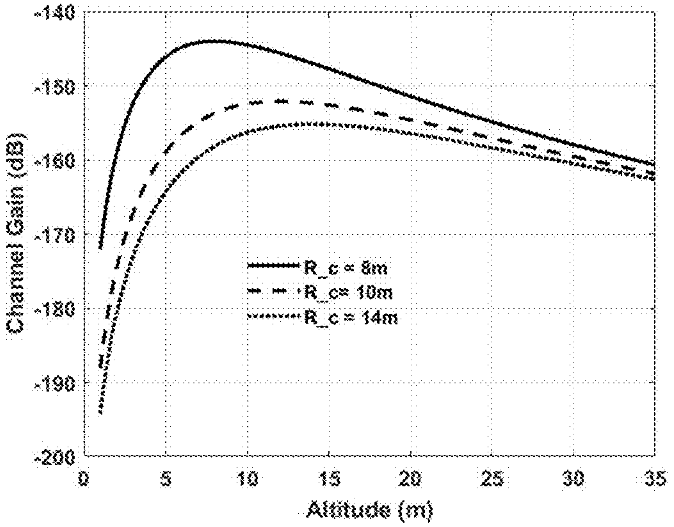

FIG. 7: Effect of altitude on channel gain.

Figure 8:
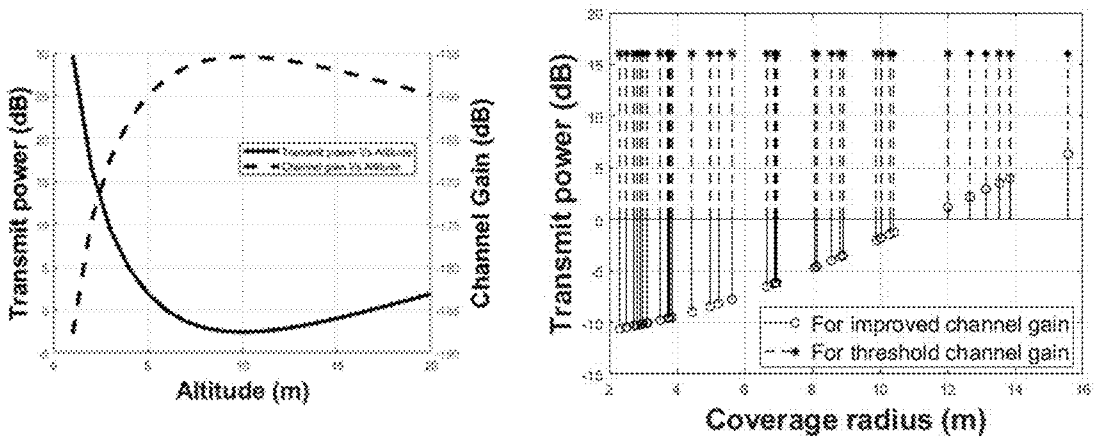

FIG. 8: Effect of channel gain on transmit power with respect to (a) altitude (b) Coverage radius.

Figure 9:
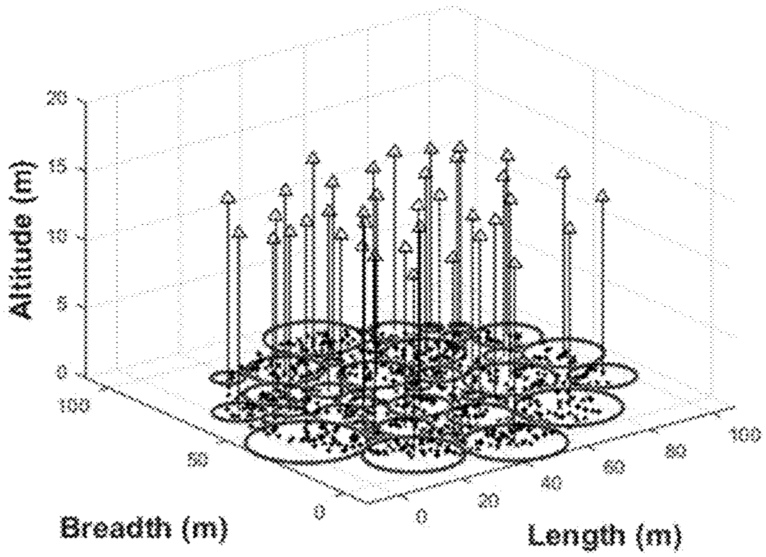

FIG. 9: 3-D deployment plot of the V-FBSs in the deployment area.

Figure 10:
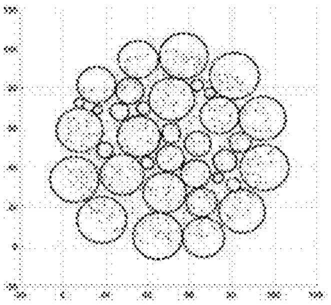
Figure 10:
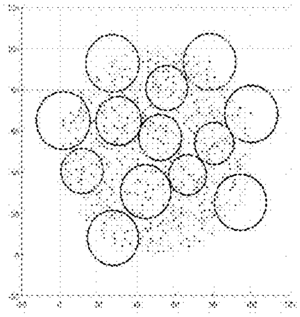
Figure 10:
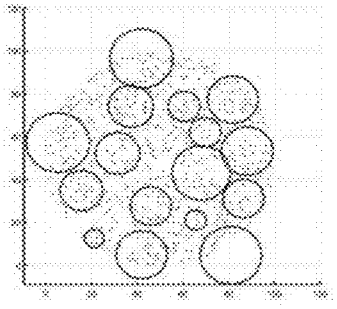
Figure 10:
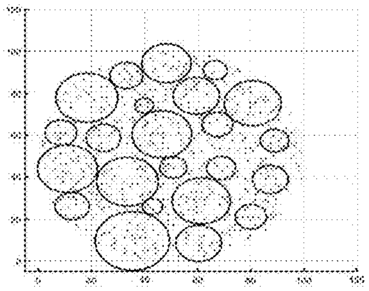

FIG. 10: Deployment strategies of the V-FBSs for MCPP user distribution using (a) VAnSA (b) Random deployment (c) GA (d) K-means.

Figure 11:
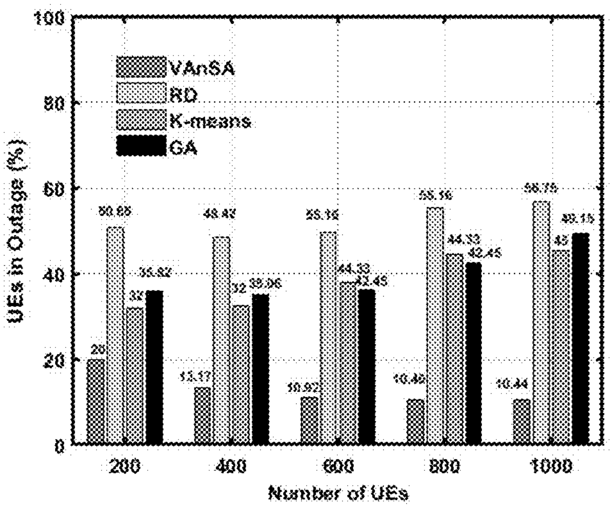
Figure 11:
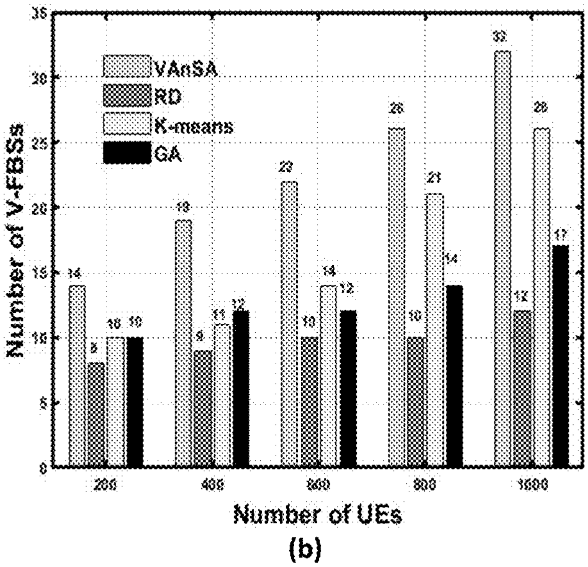

FIG. 11: V-FBS deployment results for different number of UEs following MCPP (a) UEs in Outage, (b) Number of V-FBSs.

EXAMPLE-1

System Model

During social gatherings (e.g., fests and fairs), in otherwise sparsely populated places (e.g., stadiums and arenas), the existing RF-based communication systems might reach their UE (user equipments) capacity limit. In such times, VLC-enabled FBS can be deployed as a supplementary communication system alongside the prevalent RF communications. In the proposed system, VLC ensures that the network does not interfere with the radio frequencies. Further, VLC, with its massive unlicensed bandwidth of 360 THz, also helps mitigate spectrum crunch, which is one of the bottlenecks of the fifth generation and beyond communications.

FIG. 1 shows the deployment of the V-FBS network over the target area and FIG. 2 shows the time-synchronization technique among different modules of the proposed system involved in the deployment process.

For the present invention the V-FBSs are incorporated in the cloud radio access network architecture. The aim is to make communication accessible to locations where establishing static base stations (SBS) is difficult due to unsuitable terrain or when the static base station is overloaded or destroyed. Further, the V-FBSs network can be used in the night search and rescue operation. If separate UAVs are used to provide communication and illumination, the number of UAVs required would be significant, and the CAPEX and OPEX would be high. Thus, deploying V-FBSs would reduce the CAPEX and OPEX as communication and illumination are provided simultaneously using a single V-FBS.

When the static base stations (102) are overloaded or destroyed, the users (103) associated with the static base station (FBS) may go into an outage. Hence, the need for deploying the V-FBS network arises, and the BBU pool (120) plans to deploy the network. The coordination center (121) of the BBU pool (120) performs the initial step (Step 1). When the information about the number of UEs and their location coordinates, and the area of the deployment are unavailable, in that case, the coordination center signals the sub-controller (111) in the V-FBS workshop (110) located remotely, to send a reconnaissance UAV to collect the necessary information. The reconnaissance UAV flies to the deployment zone (100) (Step 2) and gathers the information. After gathering the information the reconnaissance UAV flies back to the V-FBS workshop and reports to the sub-controller (Step 3) which further sends the information to the coordination center in the BBU pool (Step 4). However, if the information is already available to the coordination center in the BBU pool from the past history of the dys-functional SBS, then it relays the information to the processing unit in the BBU pool (Step 5). The primary function of the processing unit is to utilize the information obtained from the coordination center to find the number of V-FBSs required and their 3-D location. The motive behind finding the 3-D locations is to have a planned deployment to prevent unnecessary utilization of resources while providing reliable communication. Further, the advantage of the proposed system in the disclosure is to provide both communication and illumination. Thus depending on the requirement, the processing unit also decides on the illumination intensity and data rate. According to these requirements, the processing unit also decides the coverage radius of each V-FBS deployed. This processing unit uses the VAnSA and V-height methodologies for 3-D placement of the V-FBS network, which are explained subsequently.

The processing unit then sends this information to the sub-controller in the V-FBS workshop (Step 6). The V-FBS workshop houses and maintains all the V-FBSs (112), and the sub-controller controls them. The UAVs require a power source (e.g., batteries), electronics modules, propellers, and motors for flight. In order to use the UAV as V-FBS, a communication and illumination module are needed. The power source provides power for flight, communication and illumination. The electronics module comprises of flight controller boards, sensors (e.g., barometer, GPS, compass, gyroscope, etc.), and speed controller. The LED lights mounted on the V-FBSs serve as the communication and illumination module. VLC modulation schemes like on-off keying (OOK) can be used for transmitting the signals from the V-FBS transmitter to the UE receiver. The photodetector present in the UE (e.g. camera module in the mobile phones, tablets etc.) act as the receiver module. The LEDs used are smart LEDs where the illumination intensity can be controlled as per the requirement and are widely available in the market.

So, the sub-controller (111) checks the status of the V-FBSs and selects the ones suitable for deployment (Step 7). Once the V-FBS (112)*s* are selected, the sub-controller (111) loads the location information (the location where the V-FBSs should hover in the deployment area), required data rate, and illumination intensity in them (Step 8).

Upon loading the necessary information onto the V-FBSs successfully, the sub-controller (111) sends control feedback to the coordination center (121) (Step 9). The coordination center then sends a fly out permission signal to the sub-controller. As the BBU controls the trajectory of the V-FBS during transition towards the target area, so a fly out permission signal is sent to the sub controller (Step 10). On receiving the fly out permission, the sub-controller sends signals to the selected V-FBSs to take off (Step 11). After a successful take-off of the V-FBSs, the sub-controller intimates and hands over the control of the selected V-FBSs to the coordination center of the BBU pool (Step 13). Direct communication between the BBU pool and the deployed V-FBSs is now established via the wireless fronthaul (130).

FIG. 3 shows the system model of the V-FBS in the deployment area. The channel gain hg between the $i^{th}$ UE and the V-FBS depends on the angle of irradiance Θ, angle of incidence ϕ, the vertical distance of the V-FBS H, and the horizontal distance R.

The V-FBS network needs to maintain a certain quality of service (QoS). So, to ensure guaranteed QoS, a threshold channel gain $hg_{th}$ need to be maintained, and the coverage radius $R_c$ corresponding to this threshold channel gain is the maximum coverage radius $R_{max}$. So the coverage radius of the V-FBS should be less than $R_{max}$ to satisfy the QoS requirement.

For the present invention, a 3-D deployment strategy is proposed to facilitate the placement of the V-FBSs, ensuring QoS, energy-efficient placement and satisfying the illumination requirements. The 3-D placement is divided into horizontal placement and vertical placement. Present invention proposes the VLC-enabled anticlockwise spiral arrangement (VAnSA) for the horizontal placement. It locates the 2-D position (X, Y) of the V-FBS that generates high revenue for the network provider and offers guaranteed QoS and illumination to the UEs. It also adheres to the V-FBS capacity limit with no overlap between the coverage regions. Non overlap of the coverage regions ensures non interference in the operations of adjacent V-FBSs. Further, the energy-efficient altitude H for the V-FBS is explored through the vertical placement strategy V-height.

VAnSA: Horizontal Placement Strategy

The horizontal placement strategy is carried out at the processing unit of the BBU pool (120). This placement strategy provides the number of V-FBSs that need to be deployed and 2-D location coordinates of the position where each deployed V-FBS should hover once they reach the area of deployment (100). Further, it ensures non-overlap between the coverage areas of the adjacent V-FBSs in order to avoid interference. Once the processing unit of the BBU pool successfully obtains the 2-D coordinates using VAnSA, it calculates the optimal hovering altitude of the V-FBSs using V-height methodology. Finally the processing unit of the BBU pool passes on the 3D location information to the sub-controller of the V-FBS workshop (111).

The main aim in the horizontal deployment strategy is to maximize the number of UEs covered by each V-FBS. However various constraints need to be satisfied while maximizing the number of UEs. Firstly, all the UEs under the coverage of a particular V-FBS should be within the coverage radius of the V-FBS. Secondly, the coverage radius of the V-FBS should be less than the maximum coverage radius. This ensures the guaranteed QoS. Thirdly, the number of UEs covered by the V-FBS should be less than or equal to the V-FBS capacity K. Fourthly, there should be no overlap between the coverage regions of the adjacent V-FBSs.

To deploy the V-FBS network, the number of V-FBS along with their 2-D location (X,Y) are needed to be find out. The locations of the UEs (user equipments) are stored in the set $U=\{(x_1,y_1), (x_2,y_2), \ldots (x_N,y_N)\}$. Each V-FBS has a fixed UE handling capacity K. It is defined as the ratio of the maximum channel capacity C to the minimum offered data rate by the V-FBS to the UE. FIG. 4 shows the flowchart of VAnSA. The uncovered UEs location set U, V-FBS capacity K and the maximum coverage radius $R_{max}$ are provided as inputs (401) to run the process till all the UEs are covered (402). Then the list of uncovered boundary UEs are found out and stored their location in the set E. Said E can be found out from the convex hull of U. The set of interior UEs are stored in the set I which includes all the UEs that are present in U but not in E (403). Then the UEs are arranged in an anticlockwise manner according to their 2-D location coordinate (404). This anticlockwise arrangement makes sure that all the outliers are covered and no extra V-FBS is required to cover them. The farthest UE is obtained from the set E and then stored it in the variable $E_o$ (405). The V-FBS deployment is started ensuring that $E_0$ is covered. Then $E_{prior}$ and $I_{prior}$ are computed for $E_0$. $E_{prior}$ contains all the UE locations from the set E which is within the $2R_{max}$ distance of $E_0$. Similarly, $I_{prior}$ contains all the UE locations from the set I which are within the $2R_{max}$ distance of $E_0$ (406).

$E_0$, $E_{prior}$, $I_{prior}$, and set Gr which contains the coverage radius and 2-D position of the deployed V-FBSs are provided as input to the POSITIONING function (407). FIG. 5, shows the flowchart of the POSITIONING function. A counter variable count is initialized to calculate the number of UEs associated with the V-FBSs and a cost function $Cost_f$ (501). Then the $U_{prior}$ is calculated which is obtained by intersection of the $I_{prior}$ set with the elements present in $E_{prior}$ but not in E (502). Then we have a condition check on the count variable which should be less than or equal to the number of elements in $U_{prior}$ (503). If that is satisfied then Q is assigned as the value of $U_{prior}$(count) (504). Assuming $E_0$ and Q to be the two end points of the diameter the radius $r_0$ is calculated and the location ($x_0$, $y_0$) is noted (505). Then it is checked that if the v-FBS capacity is exceeded or not (506). If the condition is satisfied then we compute covered boundary UEs $U_{bound}$ from $E_{prior}$ and covered interior UEs $I_{in}$ from $I_{prior}$ (507). We then find the minimum of the distances between the current V-FBS and the previously deployed V-FBSs and store it in $Dis_{min}$ (508) and find the radius $Rad_{min}$ of the V-FBS corresponding to the $Dis_{min}$ (509).

Further a utility function Func is designed to find the potential UEs that can be associated with the current V-FBS. The variable $r_0$ denotes the current V-FBS radius.

$$Func = \left(\frac{Dis_{min}}{Rad_{min} + r_0} - 1\right)\frac{\|I_{in}\|}{\|I\|}\frac{\|U_{bound}\|}{\|E\|}$$

The utility function ensures that the coverage region of the V-FBS does not overlap with any of the previously deployed V-FBSs. The location and coverage radius of the V-FBS which ensure maximum utility value is selected and the covered UEs list $U_{cov}$ is updated (512).

Once the location and the coverage radius of the V-FBS are obtained, U and E in VAnSA are updated by eliminating the covered UEs so that they are not considered for the next V-FBS that is to be deployed (408).

V-Height: Vertical Placement Strategy

The vertical placement methodology is executed at the processing unit of the BBU pool (120) after the execution of the VAnSA methodology. This placement strategy provides the altitude of the V-FBSs as output. Thus, it decides the altitude where each deployed V-FBS should hover once they reach the area of deployment (100). Once the processing unit of the BBU pool successfully estimates the altitude using V-height, it passes the information to the sub-controller (111) of the V-FBS workshop.

Once the coverage radius and horizontal position of the V-FBSs are obtained, the next focus is to obtain the energy efficient altitude to provide a complete 3-D deployment. We need to find the vertical position for the V-FBS that maximizes the channel gain hg for the coverage radius (obtained from VAnSA) of the V-FBS. FIG. 7 shows the variation of channel gain with respect to altitude for a fixed coverage radius. It can be observed from the plot that at a particular altitude the channel gain is maximum for the given coverage radius. If the V-FBS hovers at this altitude then the channel gain is maximum, hence to maintain the promised QoS the transmit power can be reduced and thus the altitude can be claimed as energy efficient. The same can be verified from FIG. 8(*a*) that at energy-efficient altitude, the required transmit power to maintain the QoS is minimum as the channel gain is maximum. FIG. 8(*b*) shows how the transmit power can be reduced when the V-FBS hovers at an energy-efficient altitude compared to the V-FBS hovering at an altitude that maintains threshold channel gain for given coverage radius.

FIG. 9 shows the complete 3-D deployment plot of the V-FBSs over the deployment area. The horizontal deployment ensures that non-overlapping, capacity limit, and QoS constraints are maintained. The vertical deployment ensures that V-FBSs hover at an energy-efficient altitude. Thus, the present system provides a complete 3-D deployment for the V-FBS network, which abides by all the earlier constraints.

Example-2

Table 1 lists the simulation parameters which were used for simulation.

TABLE 1

Simulation Parameters

| Parameter | Description | Value |
|---|---|---|
| A | Area of the photo detector | $10^{-4}$ m$^2$ |
| $FOV_{LED}$ | Field of View of LED | 60° |
| $G_f$ | Gain of optical filter | 0.9 |
| $G_l$ | Gain of imaging lens | 2.4875 |
| $\phi_{1/2}$ | Transmitter semi angle at half power | 72° |
| k | Boltzman's constant | $1.38 \times 10^{-23}$ J/K |
| G | Open loop voltage gain | 10 |
| $g_m$ | Transconductance | $30 \times 10^{-3}$ S |
| $\gamma$ | FET channel noise factor | 1.5 |
| T | Temperature in kelvin | 300 K |
| $\eta$ | Fixed capacitance | $112 \times 10^8$ |
| $I_2$ | Noise Bandwidth Factor | 0.562 |
| $P_{Tx}$ | Transmit power | 10 dB |
| Ar | Area of deployment | $100 \times 100$ m$^2$ |

Matèrn cluster point process (MCPP) is used to model the V-FBS deployment area. The parent point process models the events in the deployment area and the users present in the event are modeled using the daughter point process. In random deployment (RD) (considered for comparing VAnSA), the V-FBS's position are randomly selected inside the deployment area. The selection of coverage radius is made as follows. If the number of users within the maximum coverage radius is less than K, then Rmax is the coverage radius. Otherwise, the maximum Euclidean distance becomes the coverage radius among the nearest K number of users. For a fair comparison with VAnSA, the RD strategy abides by all the constraints mentioned in the VAnSA. In order to evaluate the viability of the proposed deployment methodology, VAnSA is also compared with GA and K-means based deployment methodology proposed by Lai, C. C. et al. [IEEE Wireless Communication Letter, vol. 8, no. 3. pp. 913-916, 2019]. The authors in the above prior art used GA and K-means based deployment methodologies to locate the horizontal position of the V-FBSs. However, they did not consider the non-overlapping constraint. Hence, the non-overlapping constraint was introduced in GA and K-means based deployment methodologies to perform a fair comparison with VAnSA. FIG. 10 shows the simulation results of the deployment strategy.

Additionally, in VAnSA, the deployment methodology provides the number of V-FBSs required to be deployed. In contrast, GA and K-means require the number of VFBSs as input for their execution. So, we try to find out the number of V-FBSs within the range lower bounded by the ratio of the number of users to the capacity of each VFBS and upper bounded by 1.5 times the total number of V-FBSs obtained in VAnSA that provides the best solution for horizontal placement problem. For GA, we have considered the number of generations to be 100, the crossover rate to be 0.8, and the mutation rate to be 0.01. For the performance evaluation of the VAnSA, RD, GA, and K-means based deployment methodologies, two parameters: UEs in Outage and Numbers of V-FBS are estimated. FIG. 9 shows the deployment using VAnSA, Random, Genetic, and K-means based deployment methodologies.

The percentage of UEs not covered by any V-FBSs in the deployment zone makes up the UEs in the outage. The V-FBSs deployed to restrict the outage comprise the number of V-FBSs. We have also considered the operating cost threshold, which does not allow the system to deploy V-FBS where the number of UEs is less than 5. FIG. 11 illustrates the performance of VAnSA, RD, GA, and K-means for different numbers of UEs. From FIG. 11 (*a*), it is evident that the outage percentage is low for VAnSA compared to RD, K-means, and GA. The outage of VAnSA varies between 20% to 10.44% due to operating cost threshold assumption. In RD, the outage is maximum as non-overlapping constraints prevent close packing of the V-FBSs.

The outage in the case of GA is lower than RD but almost similar to K-means. The reason may be due to the less number of generations considered. However, outage can be reduced further by considering a more significant number of generations at the cost of more execution time. In K-means, the outage is high as the clusters are selected first, followed by selecting the V-FBS location and determining the Rc, which satisfies all the constraints. FIG. 11 (*b*) illustrates the required V-FBSs to preserve the outage shown in FIG. 11 (*a*). It is observed that since VAnSA has the least outage, it requires the maximum number of VFBSs. For RD and GA, the required number of V-FBSs is less as most of the V-FBSs do not support the operating cost threshold. In K-means, the operating cost threshold does not play a significant role as the UEs are well distributed among the clusters. Table 2 shows the outage percentages of the VAnSA, RD, GA, and K-means deployment.

TABLE 2

Outage percentage in VAnSA, RD, GA and K-means for different number of users

| | 200 UEs | 400 UEs | 600 UEs | 800 UEs | 1000 UEs |
|---|---|---|---|---|---|
| Outage in VAnSA | 20% | 13.17% | 10.92% | 10.46% | 10.44% |
| Outage in RD | 50.65% | 48.42% | 55.16% | 55.16% | 56.75% |
| Outage in GA | 35.82% | 35.06% | 42.45% | 42.45% | 49.15% |
| Outage in K-means | 32% | 32% | 44.33% | 44.33% | 45% |

Thus the present invention successfully provides system and method for joint communication and illumination through unmanned aerial vehicles. The proof of concept is shown on a simulated platform to show the efficacy of the proposed system. The system is applicable in the actual work domain. The advantages offered by the present invention:

I. The system will help to form a V-FBS assisted network over a disaster affected area immediately after the disaster.

II. The proposed system will help in setting up a secure network over the border areas to expedite the search operations by the military.

III. The proposed system will also help to provide on demand network services in hilly and remote regions.

IV. The proposed V-FBS network will help in extending coverage during Olympics, fest and concerts.

V. The V-FBS network may help in remote IoT data collection.

VI. The V-FBS network will provide illumination alongside communication.

We claim:

1. A system for telecommunication integrating a joint communication and illumination based unmanned aerial vehicles based communication network comprising:

visible light communication enabled flying base stations (V-FBSs) including LED based communication and illumination module enabled flying base stations (V-FBSs);

each said one or more LED based communication and illumination module configured to simultaneously provide illumination and direct communication to one or more user equipment's (UEs) that need operative coverage;

a cloud radio access network (CRAN) comprising of a Baseband Unit (BBU) Pool and remote radio heads (RRHs) configured to coordinate deployment and operation of one or more V-FBSs and establish connection with the baseband unit (BBU) through wireless communication links;

a processing unit for computing the number of V-FBSs required, their deployment coordinates, the data rate, and the power using VAnSA and V-height methodologies and dynamically associate the one or more UEs with selected V-FBSs which is configured to generate a utility function and find potential UEs that can be associated with current V-FBS which is based on variable $r_0$ denotes the current V-FBS radius $$Func = \left(\frac{Dis_{min}}{Rad_{min} + r_0} - 1\right)\frac{\|I_{in}\|}{\|I\|}\frac{\|U_{bound}\|}{\|E\|}$$

said utility function ensuring that the coverage region of the V-FBS does not overlap with any of the previously deployed V-FBSs, the location and coverage radius of the V-FBS which ensures maximum utility value is selected and the covered UEs list $U_{cov}$ is updated (512);

based on location and coverage area of V-FBS, the system is adapted to update U and E ensuring the already covered UEs are not considered for the next V-FBS deployment, thereby favouring a joint communication and illumination based unmanned aerial vehicle connectivity flexibility and dynamically supplemented communication network.

2. The system as claimed in claim 1 comprising said visible light communication enabled flying base stations (V-FBSs) including LED based communication and illumination module enabled flying base stations (V-FBSs) providing supplementary communication system alongside prevalent RF communications.

3. The system as claimed in claim 1 wherein said joint communication and illumination based unmanned aerial vehicles based communication network includes V-FBS workshop (110) for storing and maintaining the V-FBS operatively connected to said BBU Pool (120) via controller means (111) for desired supplemented communication network support system.

4. The system as claimed in claim 1 comprising:

a V-FBS workshop (110) for storing and maintaining said V-FBS operatively connected to said BBU pool (120) to initiate V-FBS deployment when under overload and the users (103) are in an outage;

a coordination center (121) in the BBU pool adapted to communicate with sub-controller (111) in the V-FBS workshop (110), for sending a reconnaissance UAV to the deployment area;

said V-FBS workshop (110) interactive to receive said reconnaissance UAV and reports to the sub-controller (111) regarding the area of the deployment zone (Ar), the number of UEs (N) that need coverage, and the location coordinates of the UEs;

said sub-controller (111) adapted to send the inputs to the coordination center (121) (Step 4), which in turn further adapted to offload that to the processing unit of the BBU pool (120);

said processing unit operative to relay the information to the sub-controller (111), enabling checks including the battery backup, calibration of the flight controller, and the VLC systems of all the V-FBSs;

said sub-controller (111) adapted to select the V-FBSs suitable for deployment and means for loading the information on flight altitude, velocity, acceleration, take-off time, 3-D coordinates, data rate, and illumination power onto the selected V-FBSs;

said sub-controller (111) adapted to send feedback to the coordination center (121), said coordination center generating required fly-out signal as acknowledgment;

said sub-controller (111) generating take-off signal to the selected V-FBSs and feed the coordination center about the successful take-off of selected V-FBSs and hand control and coordination to the BBU pool (120);

wherein said communication is established between the V-FBSs and the BBU pool via the wireless fronthaul.

5. The system as claimed in claim 4 wherein said V-FBS deployment is based on the channel gain hg between the $i^{th}$ UE (user equipment) and the V-FBS which depends on an angle of irradiance ⊖, an angle of incidence ϕ, a vertical distance of the V-FBS H, and a horizontal distance R and wherein preferably said V-FBS deployment is based on maintaining a threshold channel gain $hg_{th}$, and the coverage radius $R_c$ corresponding to this threshold channel gain being maximum coverage radius $R_{max}$ such that the coverage radius of the V-FBS is less than $R_{max}$ including a 3-D deployment wherein the 3-D placement is based on horizontal placement and vertical placement with said horizontal placement includes VLC-enabled anticlockwise spiral arrangement (VAnSA) which locates the 2-D position (X, Y) of the V-FBS for guaranteed QoS and illumination to the UEs and also adheres to the V-FBS capacity limit with no overlap between the coverage regions.

6. The system as claimed in claim 1 wherein each said V-FBS is having a fixed UE handling capacity K which is defined by ratio of maximum channel capacity C to a minimum offered data rate by V-FBS to the UE.

7. The system as claimed in claim 1 comprising based on coverage and horizontal position of the visible light communication enabled flying base stations (V-FBSs) including LED based communication and illumination module enabled flying base stations (V-FBSs) means for generating energy efficient altitude to provide complete 3-D deployment preferably energy efficient 3-D positions of the V-FBSs to deploy mobile network for 5G and beyond.

8. A method for telecommunication involving the system for telecommunication integrating following a joint communication and illumination based unmanned aerial vehicles based communication network as claimed in claim 1 comprising:

carrying out step of telecommunication involving said joint communication and illumination based unmanned aerial vehicles based communication network following the steps of:

providing a visible light communication enabled flying base stations (V-FBSs) including an LED based communication and illumination module enabled flying base stations (V-FBSs) wherein each said one or more LED based communication and illumination module is configured to simultaneously provide illumination and direct communication to one or more user equipment's (UEs) that need operative coverage;

configuring a cloud radio access network (CRAN) comprising of a Baseband Unit (BBU) Pool and remote radio heads (RRHs) to coordinate deployment and operation of one or more V-FBSs and establish connection with the baseband unit (BBU) through wireless communication links;

involving a processing unit for computing the number of V-FBSs required, their deployment coordinates, the data rate, and the power using VAnSA and V-height methodologies and dynamically associate the one or more UEs with selected V-FBSs which is configured to generate a utility function and find potential UEs that can be associated with current V-FBS which is based on variable $r_0$ denotes the current V-FBS radius $$Func = \left(\frac{Dis_{min}}{\text{Rad}_{min} + r_0} - 1\right)\frac{\|I_{in}\|}{\|I\|}\frac{\|U_{bound}\|}{\|E\|}$$

with said utility function ensuring that the coverage region of the V-FBS does not overlap with any of the previously deployed V-FBSs, the location and coverage radius of the V-FBS which ensures maximum utility value is selected and the covered UEs list Ucov is updated (512);

wherein based on location and coverage area of V-FBS, the system is operatively adapted to update U and E ensuring the already covered UEs are not considered for the next V-FBS deployment, thereby favouring a joint communication and illumination based unmanned aerial vehicle connectivity flexibility and dynamically supplemented communication network.

9. The method as claimed in claim 8 wherein said VLC based flying base stations (V-FBSs) disposition is carried out free of any interference with the radio frequencies and energy efficient 3-D deployment.

10. The method as claimed in claim 8 comprising:

guaranteed QoS while maintaining other than the visible light communication enabled flying base stations (V-FBSs) including LED based communication and illumination module enabled flying base stations (V-FBSs) interference and satisfying the LED based communication and illumination module enabled flying base stations (V-FBSs) capacity limit of a deployed network and minimized outrage percentage in deployment zone which is integrated in cloud radio access network (CRAN) where the visible light communication enabled flying base stations (V-FBSs) including LED based communication and illumination module enabled flying base stations (V-FBSs) serve as remote radio heads (RRHs) and establish the connection with the baseband unit (BBU) through wireless communication link.

11. The method as claimed in claim 8 wherein said V-FBSs are deployed as independent flying-base station and involved for extending coverage range of cellular communications;

BBU pool gets inputs about area of a deployment zone, number of user equipments (UEs) and UEs location by sending a reconnaissance UAV from a V-FBS workshop providing for storing and maintaining said V-FBS operatively connected to said BBU pool (120) to initiate V-FBS deployment;

wherein each visible light communication enabled flying base stations (V-FBSs) including LED based communication and illumination module enabled flying base stations (V-FBSs) capacity is considered the same and is calculated by a coordination center in the BBU pool for a total data rate that can be provided by the V-FBSs and a data rate requirement of the UE;

wherein a threshold channel gain is obtained using the QoS demand, maximum transmission power and noise power; and wherein a power of illumination, 3-D position of the V-FBSs are generated involving the VAnSA and V-height techniques.

* * * * *